United States Patent [19]

Kawashima et al.

[11] 4,249,925
[45] Feb. 10, 1981

[54] METHOD OF MANUFACTURING AN OPTICAL FIBER

[75] Inventors: Masao Kawashima, Yokohama; Hisanao Okada; Bun Kikuchi, both of Oyama, all of Japan

[73] Assignee: Fujitsu Limited, Tokyo, Japan

[21] Appl. No.: 35,843

[22] Filed: May 4, 1979

[30] Foreign Application Priority Data

May 12, 1978 [JP] Japan ............... 53-56334
May 12, 1978 [JP] Japan ............... 53-56335

[51] Int. Cl.³ ............................ C03C 25/02
[52] U.S. Cl. ........................ 65/3 A; 65/13; 65/18; 65/60 D
[58] Field of Search ........ 65/2, 3 A, 3 C, 13, 65/18, 60 D

[56] References Cited

U.S. PATENT DOCUMENTS

| | | | |
|---|---|---|---|
| 3,209,641 | 10/1965 | Upton | 65/3 A X |
| 4,118,212 | 10/1978 | Aulich et al. | 65/3 A |
| 4,126,436 | 11/1978 | Bailey | 65/13 |

FOREIGN PATENT DOCUMENTS

| | | | |
|---|---|---|---|
| 197811 | 11/1978 | Fed. Rep. of Germany | 65/3 A |
| 1134466 | 11/1968 | United Kingdom | 65/3 A |

*Primary Examiner*—Robert L. Lindsay, Jr.
*Attorney, Agent, or Firm*—Staas & Halsey

[57] ABSTRACT

A method of manufacturing an optical fiber having no defect in the refraction index profile comprising manufacturing a bare fiber by heating and extending a core starting material and forming a cladding layer on said core to produce a double-layer of the core and cladding with different refraction indices. Fine granules of oxide for the glass cladding can be formed by vapor deposition on the bare fiber, and these can be fused to form the cladding by heating. Another method for forming the cladding layer is to pass the bare fiber for the core through a fine hole provided at the bottom of a crucible in which the glass for the cladding is contained in liquid form.

10 Claims, 4 Drawing Figures

METHOD OF MANUFACTURING AN OPTICAL FIBER

BACKGROUND OF THE INVENTION

1. Field of the Invention

The present invention relates to a method of manufacturing an optical fiber to be used in the field of optical communication systems, and particularly to a method of producing an optical fiber having no defect in the profile of its refraction index.

2. Description of the Prior Art

A known method of manufacturing optical fiber is often employed wherein the core and a cladding layer are first integrated into a single unit and a fiber is then obtained by heating and expanding this integrated unit. This method has the disadvantage that the boundary between the core and the cladding is not clearly defined, with a resulting loss in total reflection, and this method also has the disadvantage that defects in the refraction index profile result in the area near the center of the core.

Degradation of the total reflection efficiency directly affects the attenuation characteristic of the optical fiber, and particularly any defect in the refraction index at the area near the center of the core portion in the single mode fiber affects significantly the optical transmission.

Requirements which should generally be provided in an optical fiber of this kind are:

1. The optical transmissivity of the core glass which is used as the optical transmission line should be quite high.
2. In order to ensure highly efficient total reflection at the boundary of the core glass and the cladding glass the boundary must be clearly defined.
3. The refraction indices of the core and cladding glass should satisfy certain conditions:

$$\frac{2\pi a}{\lambda} \sqrt{\eta_1{}^2 - \eta_2{}^2} \geqq 2.405$$

where:
n1: Refraction index of core glass
n2: Refraction index of clad glass
a: Radius of core glass
γ: Optical wavelength Generally, the following methods are well known for manufacturing optical fibers of the core glass and cladding glass combination type.

1. Double-crucible method:

The core glass material and cladding glass material are melted respectively in inner and outer crucibles forming a double-chambered crucible, and these materials are simultaneously extracted from a fine hole at the bottom of this double-crucible and formed into the fiber.

2. Rod-in tube method:

The core glass material is first formed into a rod and then inserted into a tube of the cladding glass material, and then they are both heated and fused in the form of an integrated solid rod. Thereafter, the rod is extended in the form of a wire, so that a fiber is obtained.

3. CVD Method (Chemical Vapor Deposition):

A starting material in gas form is thermally oxidized in a fused silica reaction tube which is heated and rotated by means of a lathe. The oxidized material is deposited on the inner surface of the fused silica tube. The deposit is then formed into the glass material. Thereby the thin film layers of the cladding glass and core glass can be formed repeatedly. Then, these layers are formed into a preform in the form of an integrated rod. This preform is expanded into the form of a wire by using a heat source to form the fiber.

However, in any of the above-mentioned known methods, the fiber is obtained by first forming the core and the cladding portion in an integrated body which is then heated and extended into the form of a wire. Therefore, such methods have the disadvantage that the boundary between the core and the cladding is not distinct so that the total reflection coefficient is degraded.

In addition, in the process (called the collapse process) using a CVD method where the deposited glass tube is collapsed into a solid rod, the glass tube is heated to a temperature as high as 2000° C. Thereby, both SiO₂ and the additive for controlling the refraction index (a dopant comprising GeO₂, P₂O₅ etc.) are vaporized. Moreover, this method also has another disadvantage, that the dopant (for example, GeO₂) is more easily vaporized as compared with SiO₂, so that the concentration of the additive (GeO₂ in this case) for raising the refraction index is reduced at a very thin layer on the glass surface which becomes the core portion and results in a defect in the refraction index profile in the area near the center of the core portion, and simultaneously the distribution of the refraction index is deformed. Such condition is shown in FIG. 1 where the horizontal axis represents the radial direction in the fiber, with the core portion 1 and the clad portion 2. The vertical axis represents the refraction index. This figure graphically shows the refraction index and a defect A of the distribution of the refraction index.

Particularly, the core diameter of a single mode fiber is as small as several microns and therefore generation of any defects in the refraction index profile at an area near to the center of the core portion has a distinctively bad influence on the characteristic of optical transmission.

Therefore, currently desired is a method of manufacturing a fiber wherein the boundary of the core and clad portions is defined clearly, the total reflection coefficient is excellent and simultaneously no defect in the refraction index profile is generated in the area near the center of the core.

SUMMARY OF THE INVENTION

The present invention is aimed at eliminating the above-mentioned disadvantages, and offers a method of manufacturing an optical fiber of high quality in which the boundary between the core and clad portions is distinctively defined and defects in the refraction index profile are also eliminated.

In addition, the core material must provide minimal optical loss and it should also have minimal optical absorption and scattering loss characteristics. On the contrary, there is no need of paying so much attention to the cladding material as compared with the process for forming the core portion since such material does not have such a bad influence on the optical transmission characteristic.

It is another object of the present invention to offer a method of manufacturing an optical fiber which is very effective from the various points of view discussed.

According to an embodiment of the present invention, an optical fiber having no defect in the refraction index profile can be obtained. Double layer optical fibers comprising a bare fiber as the core portion can be manufactured by heating and expanding a starting material for the core. The core and the cladding can have different values of refraction index. The cladding layer can be formed on the core by vapor depositing a fine granular oxide on the bare fiber of the core which is then heated to form the glass cladding layer. Also such a fine granular oxide may be coated directly onto the bare fiber surface of the core and thereby the glass cladding layer can be formed continuously.

According to another embodiment of the present invention, the boundary between the core and the cladding is defined clearly by forming the glass cladding layer by melting the glass material for the cladding layer in a crucible with a fine hole at the bottom and then the bare fiber of the core is passed through the fine hole. Thusly, an optical fiber having an excellent total reflection coefficient can be manufactured.

DESCRIPTION OF THE PREFERRED EMBODIMENTS

The present invention will be explained in reference to the drawings.

Figure 1:
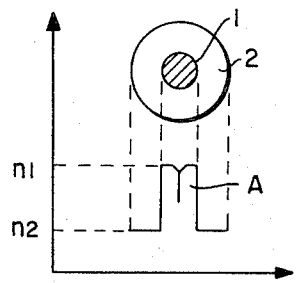
FIG. 1 shows the distribution of the refraction index of an optical fiber with a profile defect in an optical fiber manufactured by a housing optical fiber manufacturing method.
Figure 2:
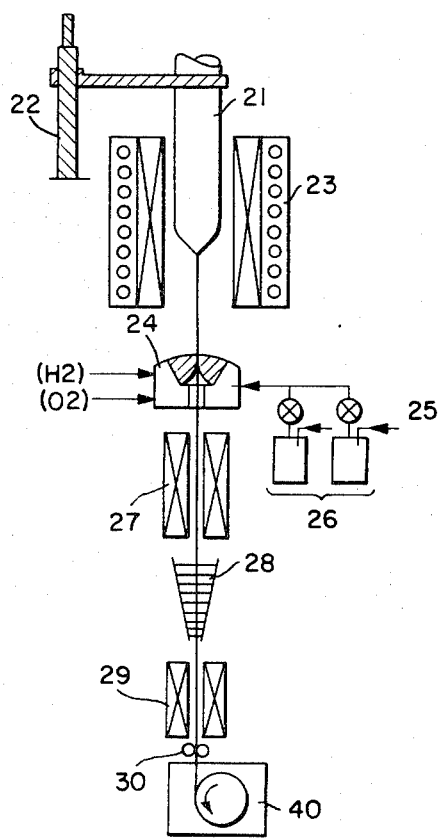
FIG. 2 shows a preferred embodiment of the present invention.

FIG. 2 shows an embodiment of a device for the present invention, namely: the starting material for the core 21; the device 22 for feeding the starting material for the core; the high frequency induction furnace 23; the ring type oxy/hydrogen burner 24; the carrier gas 25; the gas phase generation system 26; the electric furnace 27; the polymer (primary coat) coating device 28; the electric furnace 29; the fiber extracting device 30 by which the fiber is extracted and wound thereafter on the drum 40.

As the starting material of the core, high purity fused silica glass which can be obtained on the market is used. The reason why a high purity fused silica glass material is used is that many kinds of doping materials, and excessive amounts of other doping materials, cause an increase of optical transmission loss (absorption loss) and easily result in defective distribution of the refraction index as a result of vaporization and thermal diffusion of a dopant and indistinct definition of the boundary between the core and the cladding. Thus, a high purity fused silica glass material is convenient since it does not contain any such dopants.

Hereunder, the explanation will be developed sequentially in accordance with the manufacturing process of the present invention.

The outside of a high purity fused silica glass rod is mechanically polished (centerless polish) and its surface is subjected to washing with a mixed acid including hydrofluoric acid. Then, the surface is cleaned and smoothed by a fire polish treatment and further washed with hydrofluoric acid. Thereby a high purity fused silica glass rod core starting material 21 with outer diameter of 10 mm and length of 500 mm can be manufactured. Consequently, it is formed into a fiber core having an outer diameter of 100 microns by using the high frequency induction furnace 23.

In this embodiment the high frequency induction furnace 23 is used, but it is obvious that the current purpose can be attained by using any heat source that is capable of heating the glass material so that the viscocity is low enough for extending the material, for example, an electric furnace, laser, gas burner, etc.

As for the surface treatment of the outside of the fused silica glass rod which is used as the core material, processes other than the above treatment may be added if necessary, and the process also may be modified in ways obvious to one skilled in the art.

Furthermore, in this embodiment pure fused silica has been used for the core material as the optimum example, but if required in order to control the refraction index, thermal expansion coefficient and softening point, a fused silica glass material having a soluble oxide of at least one oxide of germanium, phosphorus, tin, niobium, zirconium, lanthanum, fluorine, boron, arsenic, magnesium, calcium, titanium, gallium, aluminum, antimony, tellurium, sodium, lithium, potassium and lead may be used as an additive with a content exceeding 0.1% by weight. A multi-element glass material comprising a combination with at least one of the above oxides may also be used.

Then, fine granules of boron-doped silica having thickness of about 50 microns are formed at the outside surface of the fiber core to comprise an outer diameter of 100 microns by fire hydrolysis and then the coated fiber is heated and sintered in the electric furnace 27 to form the cladding glass layer integrated with the core portion.

The integrated fiber may have a core diameter of 85 microns and a cladding thickness of about 25 microns.

Cladding by means of fire hydrolysis is formed with the method explained below. Dry oxygen which works as the carrier 25 is inflowed to the bubbler which contains silicon tetrachloride ($SiCl_4$) at 30° C., and to the bubbler which contains boron tribromide ($BBr_3$) at 30° C., and then the vapors of $SiCl_4$ and $BBr_3$ carried by this oxygen are mixed and the amount of said oxygen is adjusted so that the amount of $BBr_3$ becomes 7.1 wt%.

Thereafter, the mixed vapor of $SiCl_4$ and $BBr_3$ carried by the oxygen passes through the oxyhydrogen flame burner and is subject to hydrolysis therein. Thereby a fine granule oxide comprising $SiO_2$ in about 86 wt% and $B_2O_3$ in about 14 wt% is deposited on the surface of the core. This oxide on the fiber is supplied to the electric furnace 27 provided in the lower side and heated up to about 1350° C. and sintered to the core glass. Thus the glass cladding layer is formed.

The method of forming the glass cladding layer by means of fire hydrolysis as described above is an example of one method of vapor deposition, and it is also possible to use other methods of vapor deposition, for example, to use a heat source such as an electric furnace or a plasma torch.

Moreover, in the above-mentioned method, the process for depositing the oxide and for sintering the glass are explained separately. If desired, however, it is possible to continuously coat while directly forming the cladding glass on the core surface by means of a heat source utilizing such a method of vapor deposition.

Also employed as another method of forming the cladding layer is that the glass material for the cladding is fused in a single cavity or multi-cavity container and then the core fiber is applied to the fused glass to form the cladding layer.

Moreover, such a cladding layer can be realized by various other methods, namely:

A method where the fine glass granules for the cladding are suspended in a solvent which is coated on the core by a spray method or a brash coating method and then the cladding layer is formed after it is heated and fused;

A method where the fine glass granules for the cladding are coated on the core with a smoke method (or a vapor bathing method) and then the cladding is formed after it is heated and fused;

A method where the fine glass granules for the cladding are suspended in an electrolyte for being coated on the core and the cladding layer is formed after heating and fusing (a plating method);

A method where the pieces of glass to be applied as the cladding material are bonded onto the core with an RF sputtering method which is also used for the sputtering target and then the cladding layer is formed after it is heated and fused; and A method where a mixture of glass forming and coating material is suspended in an organic resin solvent and deposited and then the cladding layer is formed after it is heated and fused.

The composition of the glass material for cladding is related to the composition of the core material, but as is already apparent, it is also possible, if required, to change the amount of content and/or composition of an additive as compared with the composition of glass material for the core, in order to adjust the refraction index and if necessary the thermal expansion coefficient and softening point.

After formation of the cladding, a polymer, for example, a fluorine family resin (KYNAR) or a silicon resin may be coated if required in order to prevent generation of minute flaws, and thus to maintain or prevent deterioration of mechanical strength.

Figure 3:
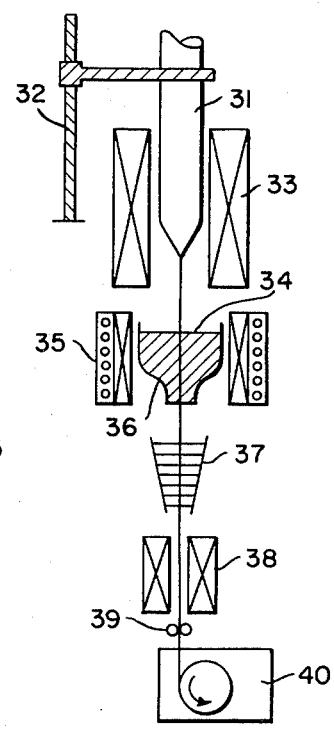
FIG. 3 shows another embodiment of the present invention.

FIG. 3 shows another embodiment for realizing the present invention, namely: the starting material 31 for the core; the device 32 for feeding the starting material for the core; the electric furnace 33; the glass material 34 for the cladding; the high frequency induction furnace 35; the glass fusing pot 36 for the cladding; the polymer (primary coat) coating device 37; the electric furnace 38; the fiber extraction device 39; and the take-up device 40.

The manufacturing processes corresponding to these FIGS. 2 and 3 will now be sequentially explained.

The outside of a high purity glass rod is polished mechanically and then its surface is subjected to a washing treatment with a mixed acid including hydrofluoric acid.

As the starting material for the core 31, a high purity $SiO_2$-$GeO_2$ glass rod may be used. Its refraction index is 1.483, while the thermal expansion coefficient is about $28 \times 10^{-7}/°C$.

Following the above-mentioned surface treatment and cleaning, a high purity glass rod with outer diameter of 10 mm and a length of 500 mm has been manufactured. This glass rod has been manufactured into the bare fiber of the core portion with an outer diameter of 95 microns through a thermal treatment and extension at a temperature from 1600° to 1700° C. in an electric furnace.

Thereafter, it may be introduced in a single structure crucible 36 having a fine hole at the bottom and located in the high frequency induction furnace 35 of a temperature of about 1400° C.

It is apparent that although the high frequency induction furnace 35 is used in this embodiment, another heat source such as an electric furnace, laser, gas burner, etc., could also heat the glass material sufficiently to lower the viscosity of the material to allow its extension.

Then, the glass cladding is formed at the surface of the bare fiber of the core with an outer diameter of 95 microns when it passes through the cladding glass and through the fine hole provided at the bottom of the crucible, and thereby the core is integrated in the optical fiber with an outer diameter of 120 microns and a core diameter of 85 microns.

As the glass for the cladding, the multi-element glass of $SiO_2$—$B_2O_3$—$Al_2O_3$—$Na_2O$ family may also be used. The thermal expansion coefficient is $33 \times 10^{-7}/°C$. which is almost equal to that of Pyrex glass, and the refraction index is 1.472.

The composition of the glass for the cladding may also be that as described previously above, and it is also comprehended in the present invention to change the content and/or composition of the additive in order to adjust the refraction index, and if required, the thermal expansion coefficient and glass softening point.

The numerical aperture of the optical fiber is 0.16 and the optical transmission loss is 9 dB/km for a light source with wavelength of 0.83 microns, but such transmission loss can be lowered by reducing the scattering loss at the boundary of the core and cladding.

After formation of the cladding, silicon resin is coated on the outside so that the outer diameter becomes 200 microns in view of preventing generation of any fine flaws or for maintaining and preventing deterioration of mechanical strength. At this time, the tensile strength is about 3.5 kg/fiber.

Figure 4:
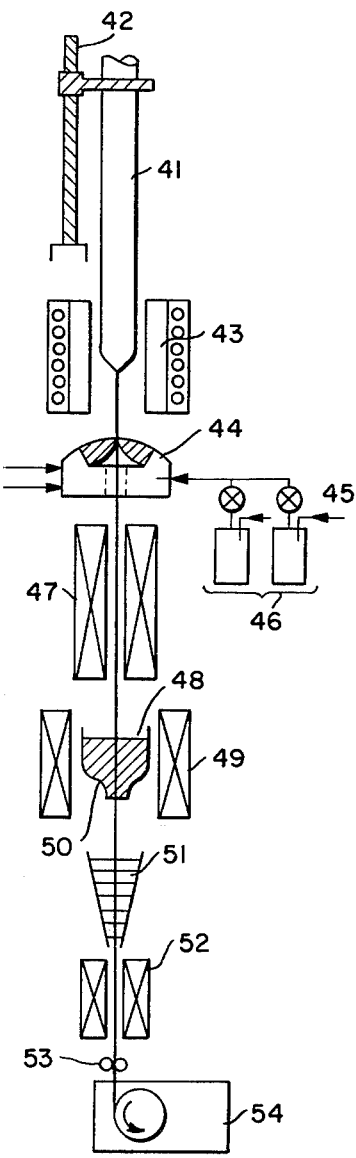
FIG. 4 shows still another embodiment of the present invention.

Another embodiment of the present invention is shown in FIG. 4; namely, the starting material 41 for the core; the device 42 for feeding the starting material for the core; the high frequency induction furnace 43; the ring type oxyhydrogen burner 44; the carrier gas 45; the gas phase generation system 46; the electric furnace 47; the glass for the cladding 48; the electric furnace 49; the cladding glass fusing crucible 50; the polymer (primary coat) coating device 51; the electric furnace 52; the fiber extraction device 53; and the take-up device 54.

In this embodiment, as the starting material for the core 41, a high purity glass rod of the $SiO_2$—$GeO_2$ family is used, and its refraction index is 1.490, while the thermal expansion coefficient is about $32 \times 10^{-7}/°C$. The starting material 41 for the core is subjected to surface treatment and cleaning and then manufactured into a high purity glass rod with an outer diameter of 10 mm and length of 500 mm.

Then, it is heated and extended at a temperature of about 1650° in a high frequency induction furnace and manufactured into a bare fiber for the core with outer diameter of 110 microns.

Consequently, in accordance with the procedures of the embodiment shown in FIG. 2, the fine granular oxide of the $SiO_2$—$GeO_2$ family is deposited at the surface of the bare fiber of the core by a fire hydrolysis method using the oxyhydrogen ring burner 44. This oxide is thereafter heated up to about 1400° C. in the electric furnace 47 just provided in the lower side and then sintered to the glass with formation of the cladding layer. Thereby, a fiber with an outer diameter of 145 microns and a core diameter of 92 microns is manufactured in an integrated core form. The composition of the glass of the cladding layer is the $SiO_2$—$GeO_2$ glass with a refraction index of 1.478 and a thermal expansion coefficient of $25 \times 10^{-7}/°C$.

Then it is coated by the glass layer through the fine hole provided at the bottom of the cladding glass fusing crucible 50. Thus, fibers with outer diameter of 148 microns and core diameter of 83 microns comprising the two kinds of glass cladding layers have been manufactured.

The thickness of the glass cladding layer can be changed in accordance with the oxide deposition onto the surface of the bare core fiber (vapor deposition condition, burner structure and size, etc.), but it largely depends on the viscosity of the glass and the drawing speed, and it is possible to control the thickness of glass cladding layer to specified dimensions.

As explained above, it is possible for the formation of the glass cladding layer to be repeated several times using the same or different methods, and an optical fiber having the fiber characteristic of a graded index can be manufactured by repeatedly applying glass layers with a different refraction index in each layer.

In addition, this method, because the core is gradually heated and extended each time a glass cladding layer is coated, is well suited for manufacturing a single mode fiber having small core diameter and thick cladding and glass layers.

The optical fiber manufactured as shown in FIG. 4 provide a transmission loss of 7.8 dB/km at light wavelength of 0.83 microns and numerical aperture of 0.19.

Coated fibers with outer diameter of 252 microns have been manufactured by coating with the silicon resin. The tensile strength of such a fiber is about 4.7 kg/fiber.

What is claimed is:

1. A method of manufacturing an optical fiber comprising a core and at least one glass cladding on said core, said method comprising the steps of:

manufacturing said core to comprise a bare fiber by heating and extending a starting material for said core, coating a starting material for said at least one glass cladding in the form of fine granules of oxide onto said core, and forming said at least one glass cladding by heating said fine granule oxide coating.

2. The method of claim 1, said forming of said core portion occurring at a higher temperature than that of said at least one cladding.

3. The method of claim 1, said heating and extending of said starting material for said core comprising selective use of an electric furnace, a high frequency induction furnace, a laser and a gas burner.

4. The method of claim 1, said starting materials for at least one of said core and cladding comprising fused silica glass.

5. The method of claim 1, said starting materials of said core and cladding each comprising a fusible oxide type glass, and at least one of said starting materials comprising at least one oxide selected from the group consisting of the oxides of germanium, phosphorus, tin, niobium, zirconium, lanthanum, fluorine, boron, arsenic, magnesium, calcium, titanium, gallium, aluminum, antimony, tellurium, sodium, lithium, potassium and lead in amount exceeding 0.1% wt.

6. The method of claim 1, said starting material for said cladding comprising a small refraction index, a small thermal expansion coefficient and a low viscosity, at the process temperature for fusing said cladding layer, as compared with said core, and excellent affinity with said core.

7. The method of claim 1, said cladding layer comprising $SiO_2$ and $B_2O_3$, and said heating of said fine granule oxide comprising a maximum temperature between 1350° and 1400° C.

8. The method of claim 1, said coating of said starting material for said cladding comprising forming said fine granules of oxide by selectively employing a spray method, a brash coating method, a smoke method, a vapor bathing method, a plating method with use of an electrolyte containing said fine granules, an RF sputtering method, and an organic resin solvent method comprising said starting materials for said cladding layer suspended in said solvent.

9. The method of claim 1 comprising coating said optical fiber with another cladding layer comprising a polymer for preventing deterioration of the mechanical strength of said optical fiber.

10. The method of claim 1 comprising heating and extending said core portion during said forming of said at least one cladding.

* * * * *